Dec. 28, 1926.
R. CRAIN
1,612,418
SURFACE MEASURING MACHINE
Filed Oct. 21, 1922
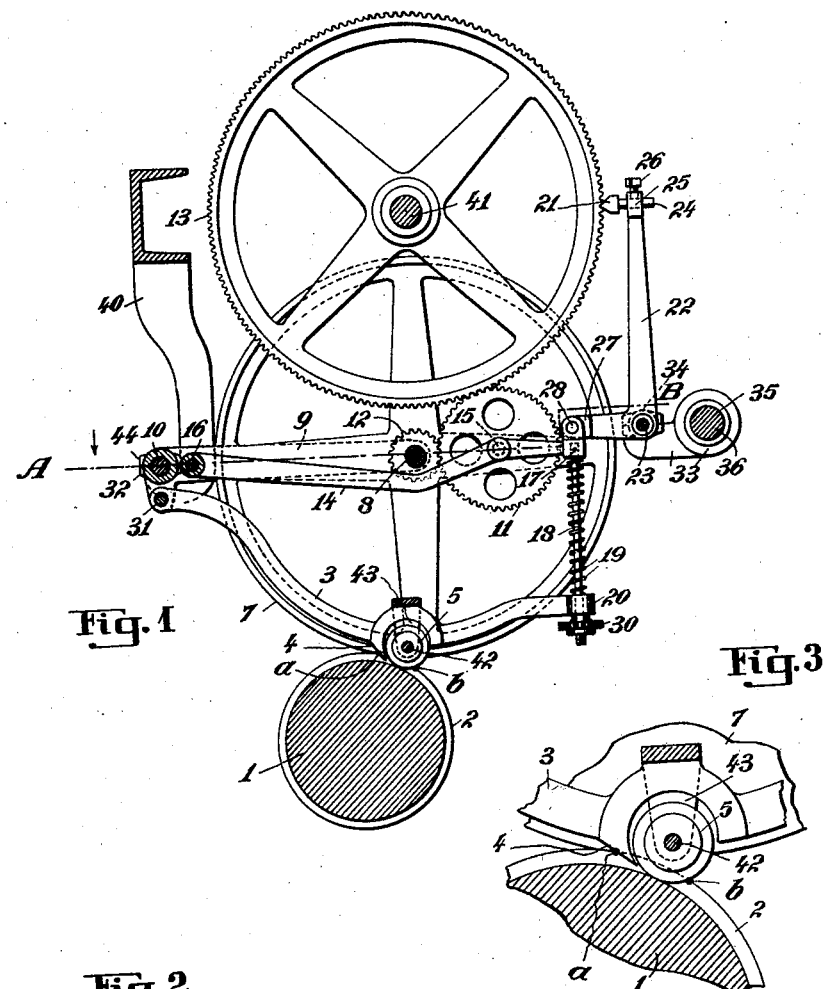
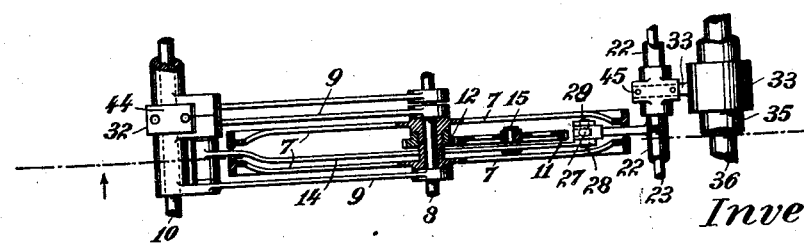
Inventor
Rudolf Crain
by *Attorney.*

Patented Dec. 28, 1926.

1,612,418

UNITED STATES PATENT OFFICE.

RUDOLF CRAIN, OF OBERURSEL, GERMANY.

SURFACE-MEASURING MACHINE.

Application filed October 21, 1922, Serial No. 596,174, and in Germany November 2, 1921.

The invention relates to machines for measuring the area of leather or the like, of the type in which the leather is supported and fed by a continuously rotating roller and rotates by friction a series of measuring wheels while being fed. As the leather passes beneath the measuring wheels pinions connected thereto are lifted to engage gears affecting the registering device.

Commonly the pinions are fastened to the measuring wheels as to rotate therewith and to come into mesh with the registering gears as the measuring wheels are lifted by the goods to be measured. In contradistinction to this common arrangement I make use of fingers projecting into grooves of the roller. The goods lifts the fingers out of the grooves even it is very thin in which case the goods would not be able to lift in any appreciable degree the measuring wheels.

According to my invention each finger forms a member of a polygon linkage carrying the pinion to be brought into engagement with the corresponding registering gear. The fingers and linkages are independent from each other and give always a full engagement of the pinions and gears irrespective of the variations of thickness of the measured goods as well as of the different parts of the leather in contact with the several fingers.

It is a further object of my invention to combine the fingers with intermediary pinions which are in continuous mesh with the pinions of the measuring wheels and are brought into mesh with the registering gears when the fingers are lifted. These intermediary pinions are of a small diameter and of a small weight so that the fingers are easily lifted by the goods and do not deteriorate the appearance of the latter.

Moreover the fingers do not contact with the bottom of the grooves but are suspended as to project into the grooves for any desired small distance. The fingers are connected to the detents stopping the rotation of the registering gears so as to be carried by the stops in an adjustable height. The goods lift the fingers and brings the detents out of engagement with the registering gears when it enters the machine and allows the fingers to fall and the detents to come into engagement with the said gears when it leaves the machine.

The above and other features of the invention, including certain details of construction and combination of parts, will now be described with reference to the accompanying drawings and pointed out in the claims.

In the drawings,

Fig. 1 is a partial vertical section of the machine showing one set of the series of the parts connected to and coacting with one finger, Fig. 2 is a cross-section on the line A—B of Fig. 1, and Fig. 3 is a detail view of the coacting parts of the finger and the roller in a greater scale.

1 is the continuously rotating supporting roller provided with the shallow grooves 2. Into each groove 2 projects a lifting finger 3 with a sloping nose 4 and an antifriction roller 5. On the rest the finger 3 is curved concentrically to the periphery of the measuring wheel 7 but is of a radius smaller than the wheel to be out of contact with the thickest goods likely to be measured.

The measuring wheels 7 turns on a pivot 8 carried by the arms 9 pivotally mounted on the shaft 10 journaled in the frame 40. The wheel 7 consists of two discs with a common hub therebetween upon which the pinion 12 is fastened. The pinion 12 is in constant mesh with the intermediate pinion 11 rotatable on the pin 15 of the arm 14 mounted at its one end upon the pivot 16 between the arms 9 and at its other end on the pivot 17 of the bolt 18 supported by the springs 19 on the finger 3 and freely guided in the eye 20 of the latter. The nut 30 allows of an adjustment of the intermediary pinion 11 with respect to the registering gear 13 as to obtain the least possible free distance between the peripheries. This adjustment is independent of the thickness of the goods to be measured. The registering gears 13 are journaled above the measuring wheels 7 on the fixed shaft 41. The rotation of the measuring wheels 7 and of the pinions 12 is transmitted to the registering gears 13 by the intermediary pinions 11 as soon as the latter are brought into mesh with the registering gears 13.

As the goods enters the machine at first the measuring wheel 7 will be raised accordingly to the thickness of this goods. But the raising of the measuring wheel 7 is of no influence upon the measuring operation itself, as this raising does not lift the intermediary wheels 11 and these conditions remain so irrespective of the thickness of the measured goods.

The finger 3 is lifted and the engagement of the wheels 11, 13 takes place as soon as the goods to be measured comes in contact with the sloping nose 4 of the finger at the point a, where the nose cuts the periphery of the roller 1. The part of the finger 3 projecting into the groove 2 is formed as a small antifriction roller 5 rotating on a pin 42 fastened in ears 43 of the finger 3. So long as the roller 5 remains on the measured goods the wheels 11, 13 are in full engagement. The variations of the thickness of the goods are met by the elasticity of the spring 19. The engagement of the wheels 11, 13 ceases when the goods come out of contact with the rollers 1, 5 at the point b.

In order to obtain the total surface area the measuring gears 13 must be stopped in their position every time their engagement with the intermediary wheel 11 is interrupted. This is done by the detents 21 arranged on the knee lever 22. These levers are carried on the shaft 23 supported in journals 34 and connected at their ends 27 by pins 28 to the bolts 19. The detents 21 have stems 24 slidable in the eyes 25 of the levers 22 and can be fastened in the adjusted position by screws 26. As easily seen the lifted fingers 3 swing through the medium of the springs 19 the knee levers 22 in a clockwise direction and unlock the measuring gears 13 while in the shewn position the weight of the parts 3, 18, 14, 11 tends to keep the detents 21 in engagement with the gears 13 and to stop them against rotation. The nuts 30 may be so adjusted that the rollers 5 do not lie on the bottom of the grooves 2 and the weight of the said parts is suspended on the engaged detents 21. The detents 21 are wedge shaped on their upper and lower sides as to act in either direction of rotation of the gears 13. The gears and pinions have normally shaped involute teeth. When the goods enters the machine the fingers are lifted and unlock the detents, when the goods leaves the machine the detents engage the gears.

As stated there is a series of sets of the parts described arranged in close proximity of and parallel to each other. According to the present invention provision is made for an easy and accurate mounting of the parts as every set can be assembled separately outside of the machine. To this end the arm 14 and the finger 3 are pivoted to the arm 9 by the pins 16 and 31 relatively. The arms 9 themselves are slid on a shaft 10. This shaft is divided in several parts, supported in journals 32 with removable covers 44. While the assembled parts 9, 3, 14, 19 are carried on the divided shaft 10, the detent-levers 22 are supported by a similarly divided shaft 23 in the journals 34 with the upwardly removable covers 45. The journals 34 are arranged on the levers 33 fastened to a pipe 35 rotatable on the shaft 36. At the end of the measuring operation the levers 33 are swung in an anticlockwise direction by turning the pipe 35 in order to free the measuring gears from the detents 21 and to allow them to return into their initial position in the manner well known in the art.

Having described the invention, what I claim as new and desire to secure by Letters Patent of the United States is:

1. In a surface measuring machine the combination with a continuously rotating grooved roller and coacting measuring wheels for feeding the goods to be measured and registering gears held in motion so long as the goods are fed and pinions rotating with the measuring wheels, of a polygon linkage projecting with individual members into the grooves of the feeding roller and lifted from the grooves by the passing goods, intermediary pinions on the linkage in constant mesh with the pinions of the measuring wheels and adapted to couple the latter pinions with the registering gears.

2. In a surface measuring machine the combination with a continuously rotating grooved roller and coacting measuring wheels for feeding the goods to be measured and held in motion so long as the goods are fed, of a polygon linkage having individual members projecting into the grooves of the roller, second members carrying pinions coupling the registering gears with the measuring wheels when the goods are passed through the machine and means connecting the said members yieldingly when the first members are lifted by the goods and connecting them positively when no goods are in the machine.

3. In a surface measuring machine, measuring gears, registering gears, means adapted to connect said measuring gears with said registering gears, detents adapted to engage and to stop the registering gears, and means connecting the detents with the measuring gears for bringing the detents into engagement with the registering gears when the measuring gears come out of contact with the goods passed through the machine.

4. In a surface measuring machine the combination with a continuously rotating grooved roller and coacting measuring wheels for feeding the goods to be measured and registering gears held in motion as long as the goods are fed, of a polygon linkage having members projecting into grooves of the feeding roller and lifted from the grooves by the passing goods, pinions on the linkage coupling the registering gears with the measuring wheels and detents connected to the linkage as to stop the rotation of the registering gears when the said members project into the grooves and to allow the registering gears to rotate when the members are lifted by the treated goods.

5. In a surface measuring machine the combination with a continuously rotating grooved roller and coacting measuring wheels for feeding the goods to be measured and registering gears held in motion as long as the goods are fed, of a polygon linkage having members projecting into grooves of the feeding roller and lifted from the grooves by the passing goods, pinions on the linkage coupling the registering gears with the measuring wheels, detents stopping the rotation of the registering gears when the said members project into the grooves and means connecting the linkage with the detents so that the weight of the linkage tends to bring the detents into engagement with the registering gears.

6. In a surface measuring machine the combination with a continuously rotating grooved roller and coacting measuring wheels for feeding the goods to be measured and registering gears held in motion as long as the goods are fed, of a polygon linkage having members projecting into grooves of the feeding roller and lifted from the grooves by the passing goods, pinions on the linkage coupling the registering gears with the measuring wheels, detents connected to the linkage as to stop the rotation of the registering gears when the said members project into the grooves and means for adjusting the depth to which the members project into the grooves.

7. In a surface measuring machine the combination with a continuously rotating grooved roller and coacting measuring wheels for feeding the goods to be measured and registering gears held in motion as long as the goods are fed, of a polygon linkage having members projecting into grooves of the feeding roller and lifted from the grooves by the passing goods, pinions on the linkage coupling the registering gears with the measuring wheels, detents stopping the rotation of the registering gears when the said members project into the grooves, levers connecting the detents with the linkage and means for adjusting the detents on the levers.

In testimony whereof I affix my signature.

Dr. RUDOLF CRAIN.